(12) United States Patent
Molitor

(10) Patent No.: US 7,490,819 B2
(45) Date of Patent: Feb. 17, 2009

(54) X-SHAPED ELASTOMERIC SPRING

(75) Inventor: Michael P. Molitor, North Aurora, IL (US)

(73) Assignee: Miner Elastomer Products Corporation, Geneva, IL (US)

( * ) Notice: Subject to any disclaimer, the term of this patent is extended or adjusted under 35 U.S.C. 154(b) by 0 days.

(21) Appl. No.: 11/345,351

(22) Filed: Feb. 1, 2006

(65) Prior Publication Data

US 2007/0176341 A1    Aug. 2, 2007

(51) Int. Cl.
*B60G 11/22* (2006.01)
*F16F 1/36* (2006.01)

(52) U.S. Cl. ........................ 267/292; 267/153
(58) Field of Classification Search ............... 267/292, 267/153, 152, 141.1
See application file for complete search history.

(56) References Cited

U.S. PATENT DOCUMENTS

| | | | |
|---|---|---|---|
| 2,706,112 A * | 4/1955 | Carrier, Jr. ................. | 267/153 |
| 2,980,156 A | 4/1961 | Meyer | |
| 3,035,825 A * | 5/1962 | Weller ........................ | 267/152 |
| 3,279,779 A * | 10/1966 | Kloss et al. ................. | 267/153 |
| 3,322,377 A * | 5/1967 | Morlon ..................... | 267/141.6 |
| 3,456,939 A | 7/1969 | Duchemin | |
| 3,556,503 A * | 1/1971 | van Moss, Jr. ............. | 276/3 |
| 3,698,702 A | 10/1972 | Bock | |
| 4,073,858 A * | 2/1978 | Chung ....................... | 264/262 |
| 4,489,922 A | 12/1984 | Fesko | |
| 4,557,500 A | 12/1985 | Collard et al. | |
| 4,611,793 A | 9/1986 | Nishiyama et al. | |
| 4,771,997 A | 9/1988 | Haldenwanger | |
| 4,772,044 A | 9/1988 | Booher | |
| 4,886,266 A | 12/1989 | Trulasko | |
| 4,938,473 A | 7/1990 | Lee et al. | |
| 4,984,810 A | 1/1991 | Stearns et al. | |
| 4,988,080 A | 1/1991 | Shah | |
| 5,016,861 A | 5/1991 | Thompson et al. | |
| 5,029,801 A | 7/1991 | Dalebout et al. | |
| 5,044,598 A * | 9/1991 | Mann et al. ................. | 248/638 |
| 5,251,930 A | 10/1993 | Kusaka et al. | |
| 5,280,890 A | 1/1994 | Wydra | |
| 5,425,829 A | 6/1995 | Chang | |
| 5,868,384 A | 2/1999 | Anderson | |
| 5,957,441 A | 9/1999 | Tews | |
| 6,012,709 A | 1/2000 | Meatto et al. | |
| 6,406,009 B1 | 6/2002 | Constantinescu et al. | |
| 6,435,490 B1 * | 8/2002 | Monson et al. ............. | 267/141 |
| 6,457,729 B2 | 10/2002 | Stenwall | |

(Continued)

*Primary Examiner*—Robert A Siconolfi
*Assistant Examiner*—Vu Q Nguyen
(74) *Attorney, Agent, or Firm*—Law Office of John W. Harbst

(57) ABSTRACT

A one-piece elastomeric spring having four spaced end portions all joined to and extending from a common body portion. Two end portions are commonly disposed to each side of an axis of the spring such that each end portion can independently deflect when a force is applied thereto. The one-piece spring is formed from a preform formed from an elastomer which is normally free of spring-like characteristics. The elastomer from which the preform is created has a molecular structure along with a ratio of plastic strain to elastic strain greater than 1.5 to 1. The molecular structure of the preform is oriented in at least one direction so as to allow a predetermined spring rate to be imparted to the preform whereby transmuting the preform into an elastomeric spring.

16 Claims, 5 Drawing Sheets

U.S. PATENT DOCUMENTS

| | | |
|---|---|---|
| 6,585,625 B1 | 7/2003 | Ferguson |
| 6,719,671 B1 | 4/2004 | Bock |
| 6,811,169 B2 | 11/2004 | Schroeder et al. |
| 6,811,170 B2 | 11/2004 | Mosler |
| 7,108,252 B2 * | 9/2006 | Jayakumaran ............... 267/151 |
| 2003/0173724 A1 * | 9/2003 | Jayakumaran ............... 267/136 |

* cited by examiner

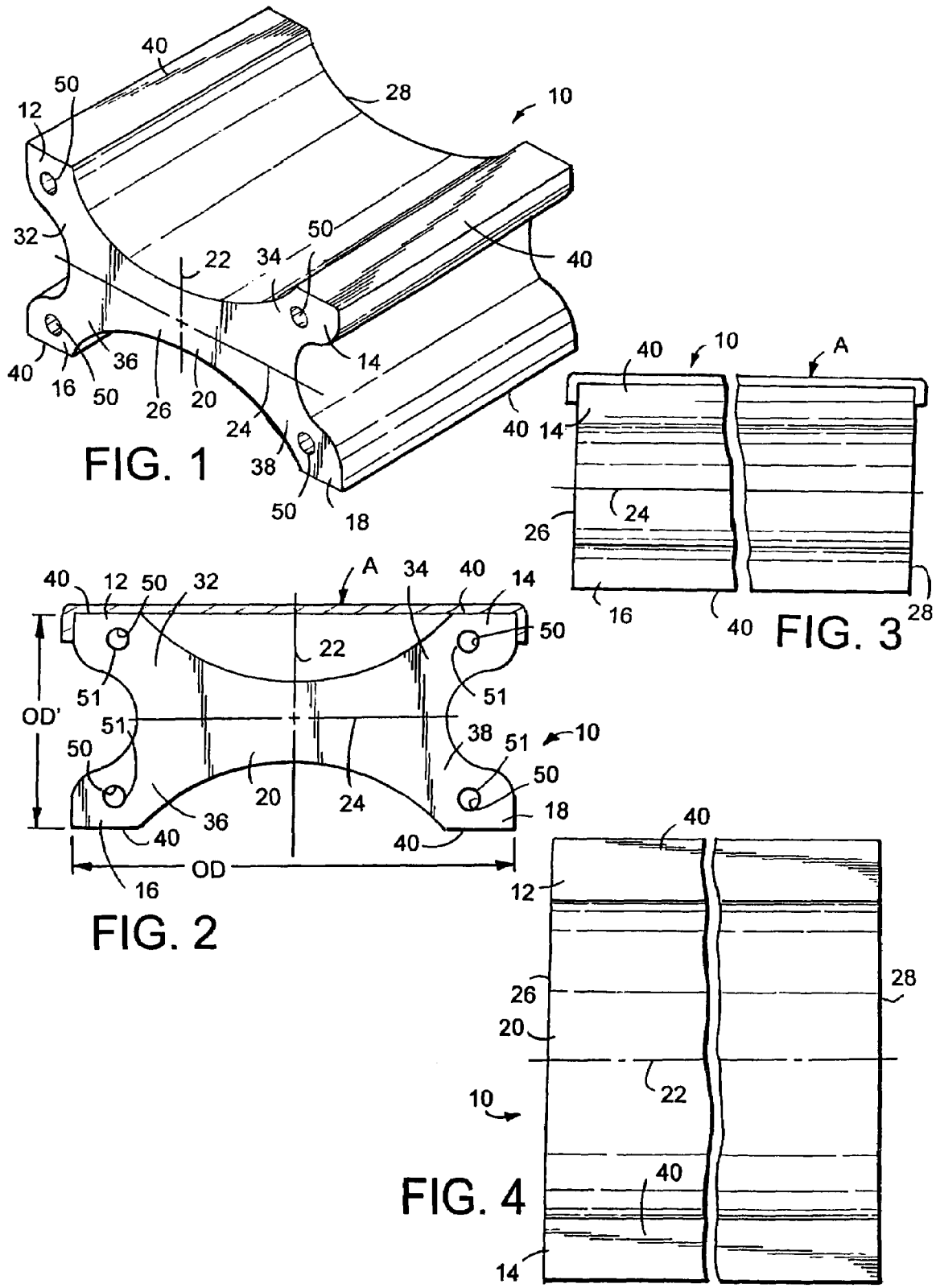

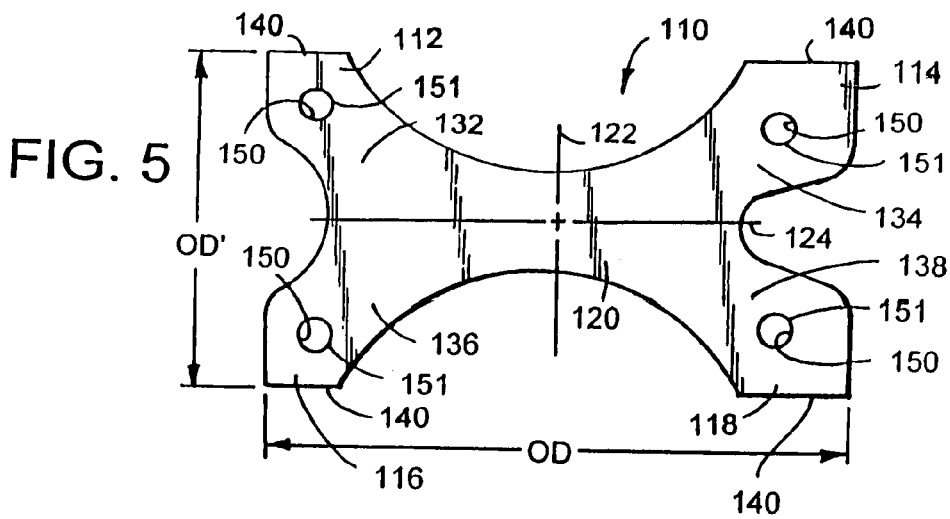
FIG. 5
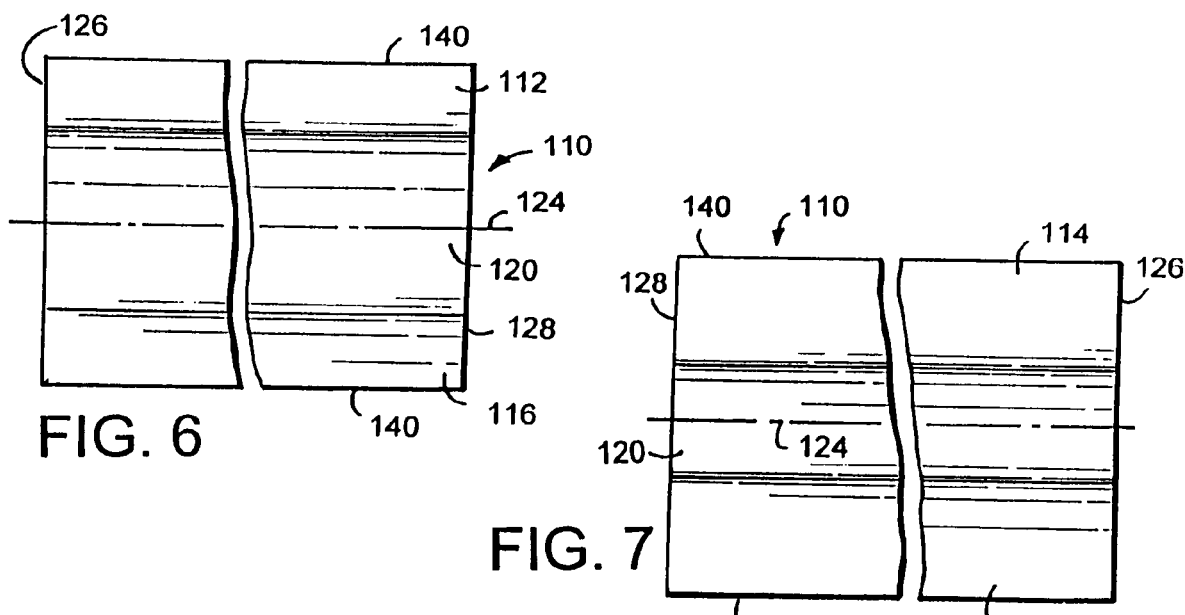
FIG. 6
FIG. 7
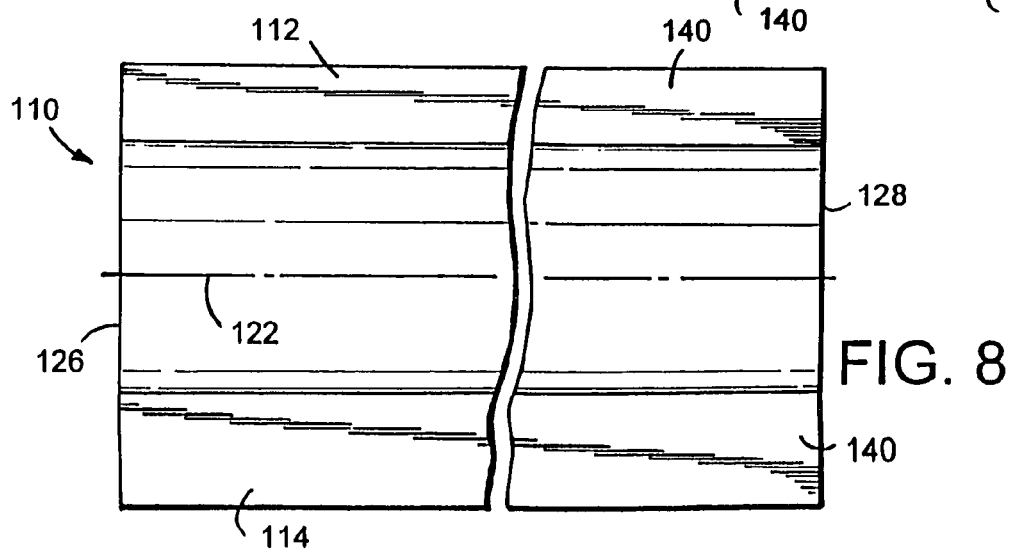
FIG. 8

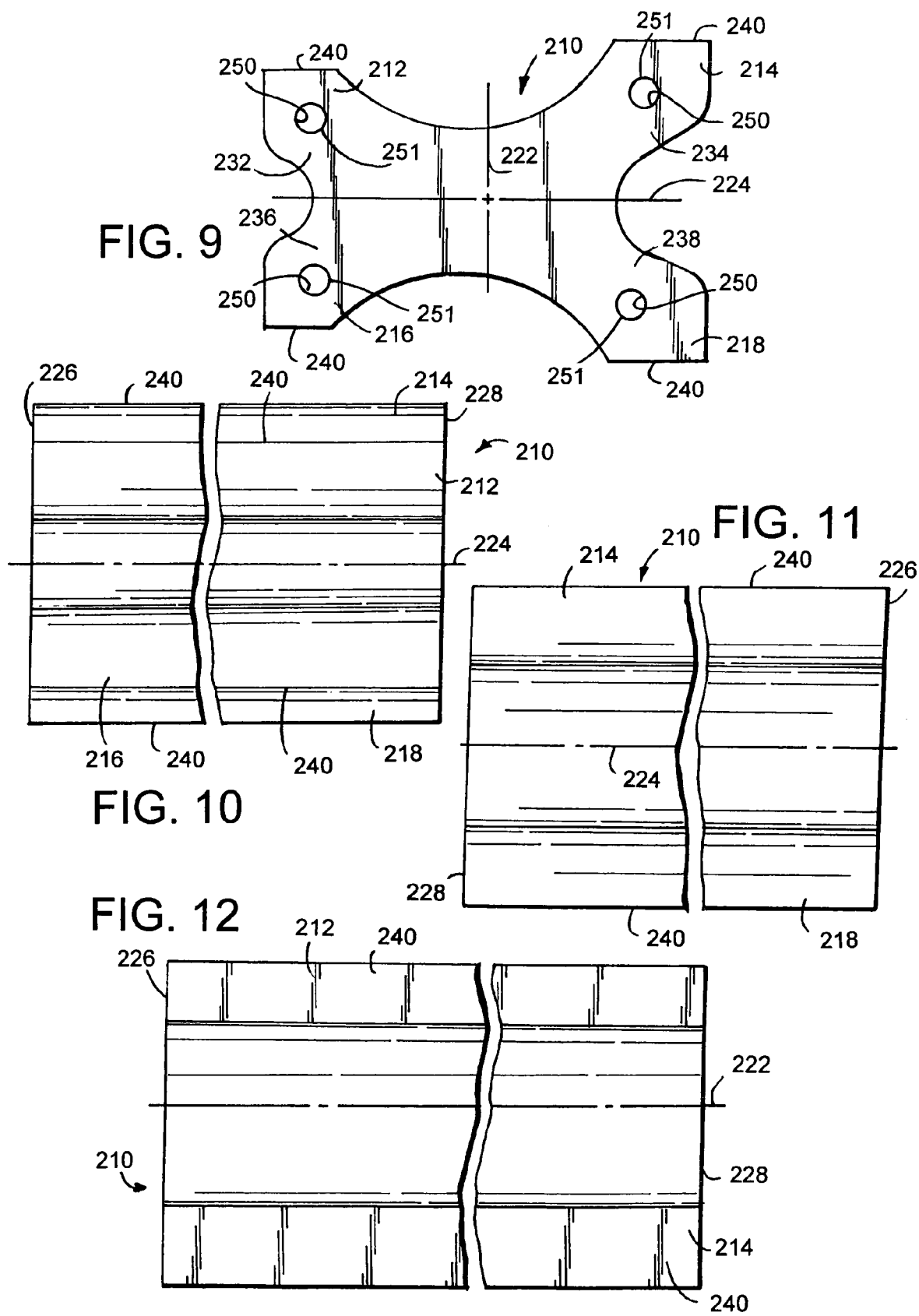

X-SHAPED ELASTOMERIC SPRING

FIELD OF THE INVENTION

The present invention generally relates to an elastomeric spring and, more particularly, to a one-piece generally X-shaped elastomeric spring.

BACKGROUND OF THE INVENTION

Springs manufactured from elastomer materials are well known in the art. Such springs typically have a cylindrical shape and are directed to applications requiring very high spring rates for absorbing substantial quantities of energy in applications such as are associated with the railcar industry. In addition, such known springs are designed to absorb energy directed axially against one or both ends of the spring.

Elongated springs which are curved have broad and varied applications and are commonly used to absorb and return energy. Typically, with this type of spring, the load is generally applied to an apex of the curved spring and one or both of the longitudinally spaced ends thereof are confined against longitudinal expansion.

It can be beneficial if the spring can be adjusted to affect the spring rate. It is difficult to predict the exact conditions and stresses to which such a spring will be subjected. The fatigue life of most curved springs, however, is generally limited, thus, increasing the required maintenance of the apparatus with which the spring is arranged in operable combination.

Depending upon their application, most curved springs are loaded not only vertically but also by horizontal forces and torques in the longitudinal vertical and transverse vertical planes. Such forces can be generated in several different modes of operation which, again, are highly dependent upon the particular spring application. The stresses induced in the spring can be quite high. In some applications, the spring is required to offer a first spring force or first resistance when operated in one direction and a second spring force or second resistance when operated in a second direction. Moreover, the spring must be capable of operating under repetitive and extended cyclic operations.

In view of the above, and in accordance with the present invention, there is a continuing need and desire for an elastomeric spring capable of offering a first spring force or first resistance when operated in one direction and a second spring force or second resistance when operated in a second direction and which offers substantially constant repetitive operating characteristics with no significant deterioration during operation.

SUMMARY OF THE INVENTION

In view of the above, and in accordance with one aspect, there is provided a one-piece elastomeric spring having four spaced end portions all joined to and extending from a common body portion. Two end portions are commonly disposed to each side of an axis of the spring such that each end portion can independently deflect when a force is applied thereto. The one-piece spring is formed from an elastomeric preform which is normally free of spring-like characteristics. The elastomer from which the preform is created has a molecular structure along with a ratio of plastic strain to elastic strain greater than 1.5 to 1. The molecular structure of the preform is oriented in at least one direction so as to allow a predetermined spring rate to be imparted to the preform whereby transmuting the preform into an elastomeric spring.

Preferably, the elastomeric spring has a spring rate which can be varied by adjusting a distance each end portion is disposed away from the common body portion. In one form, the preform forming the spring has a series of arms projecting in opposed directions away from the common body portion, with each arm terminating in one of the end portions. In one form, the arms on the preform are preferably configured such that the two arms disposed to one common side of the preform combine with each other to provide the spring with a first spring rate. The two arms disposed to an opposed common side of the preform combine with each other to provide the spring with a second spring rate.

In that embodiment where the spring has a series of arms radially projecting from the common body portion, the arms generally correspond in cross-sectional configuration to each other whereby allowing each arm to provide a spring rate generally equal to that provided by the other arms of the spring. In another form, each arm of the spring has a cross-sectional configuration unlike that provided by the other arms on the spring such that each arm provides a spring rate which is different from the spring rate provided by the other arms of the spring. In still another embodiment, the two arms, disposed to a common side of the spring, generally correspond in cross-sectional configuration such that those two arms provide a spring rate different from the spring rate provided by the other arms of the spring.

According to another aspect, there is provided a one-piece generally X-shaped elastomeric spring including four spaced and free ended portions all joined to and extending from a common body portion. Each free ended portion defines an aperture having a closed margin. Two free ended portions are disposed to each side of an axis of the spring such that each end portion can radially and flexurally deflect independent of the others when a force is applied to the spring. According to this aspect, the one-piece spring is formed from an elastomeric preform which is normally free of spring-like characteristics. The elastomer from which the preform is created has a molecular structure along with a ratio of plastic strain to elastic strain greater than 1.5 to 1. The molecular structure of the preform is oriented in at least one direction so as to allow a predetermined spring rate to be imparted to the preform whereby transmuting the preform into the elastomeric spring.

Preferably, the spring has a spring rate which can be varied by configuring the preform such that each free ended portion is disposed a predetermined distance away from the common body portion. In one form, the elastomeric spring is configured with a series of arms projecting in opposed radial directions away from the common body portion. Each spring arm terminates in one of the free end portions.

In a preferred form, the spring arms are configured such that the two spring arms disposed to a common side of the preform combine with each other to provide the spring with a first spring rate. The two arms disposed to an opposed common side of the preform combine with each other to provide the spring with a second spring rate. In one form, all the spring arms generally correspond in cross-sectional configuration such that each arm provides a spring rate generally equal to that provided by the other arms of the spring. Alternatively, the arms disposed to a common side of the spring have a different cross-sectional configuration from those arms disposed to an opposite side of the spring.

According to another aspect, there is provided a one-piece elastomeric spring created from an elastomeric preform which is normally free of spring-like characteristics. The preform has a generally X-like shape and includes a series of arms radially projecting from a central body portion. The preform has an initial predetermined width defined by a first distance between distal and free ends of two of the arms disposed to a common side of the central body portion. The preform also has an initial predetermined height defined by a second distance between distal and free ends of two of the arms disposed to opposite sides of the central body portion. Moreover, the preform has an initial predetermined length defined by a third distance between opposed sides of the preform. The elastomer forming the preform has a molecular structure along with a ratio of plastic strain to elastic strain greater than 1.5 to 1. The molecular structure of at least a portion of the preform is oriented as a result of working the preform by an extent greater than 30% to 35% the initial predetermined width and the initial predetermined height of the preform thereby allowing the preform to transmute into the elastomeric spring.

In a preferred form, the resultant spring has a spring rate which can be varied by configuring the preform such that the free end of each arm is disposed a predetermined distance away from the common body portion. Preferably, one pair of arms on the spring has a cross-sectional configuration unlike that provided by the other pair of arms of the spring such that each pair of arms provide a spring rate which is different from the spring rate provided by the other pair of arms of the spring. Alternatively, at least two of the arms on the spring generally correspond in cross-sectional configuration such that those two arms provide a spring rate different from the spring rate provided by the other arms of the spring. In another form, the arms on a common side of the spring each have a different cross-sectional configuration from those arms on an opposite side of the spring. In a preferred embodiment, each arm of the spring defines an aperture with a closed margin defined toward a distal end of the arm to facilitate connecting the spring to an apparatus.

Based on the foregoing, the present invention provides an elastomeric spring having a generally X-shaped cross-sectional configuration.

Another feature of the present invention relates to providing an elastomeric spring whose cross-sectional design can be readily changed to modify the operating characteristics of the spring.

These and other features, aims and advantages of the present invention will become more readily apparent from the following drawings, detailed description and appended claims.

DESCRIPTION OF THE DRAWINGS

FIG. 1 is a top, right side perspective view of one form of an elastomeric embodying principals of the present invention;

FIG. 2 is an end elevational view of the elastomeric spring shown in FIG. 1;

FIG. 3 is a fragmentary side view of the elastomeric spring shown in FIG. 1;

FIG. 4 is a fragmentary top plan view of the spring illustrated in FIG. 1;

FIG. 5 is an end elevation view of another form of elastomeric spring embodying principals of the present invention;

FIG. 6 is a fragmentary left side view of the spring shown in FIG. 5;

FIG. 7 is a fragmentary right side view of the spring shown in FIG. 5;

FIG. 8 is a fragmentary top plan view of the spring illustrated in FIG. 5;

FIG. 9 is an end elevational view of another alternative form of an elastomeric spring embodying principals of the present invention;

FIG. 10 is a fragmentary left side view of the spring shown in FIG. 9;

FIG. 11 is a fragmentary right side view of the spring shown in FIG. 9;

FIG. 12 is a fragmentary top plan view of the spring shown in FIG. 9;

DESCRIPTION OF THE INVENTION

Figure 13:
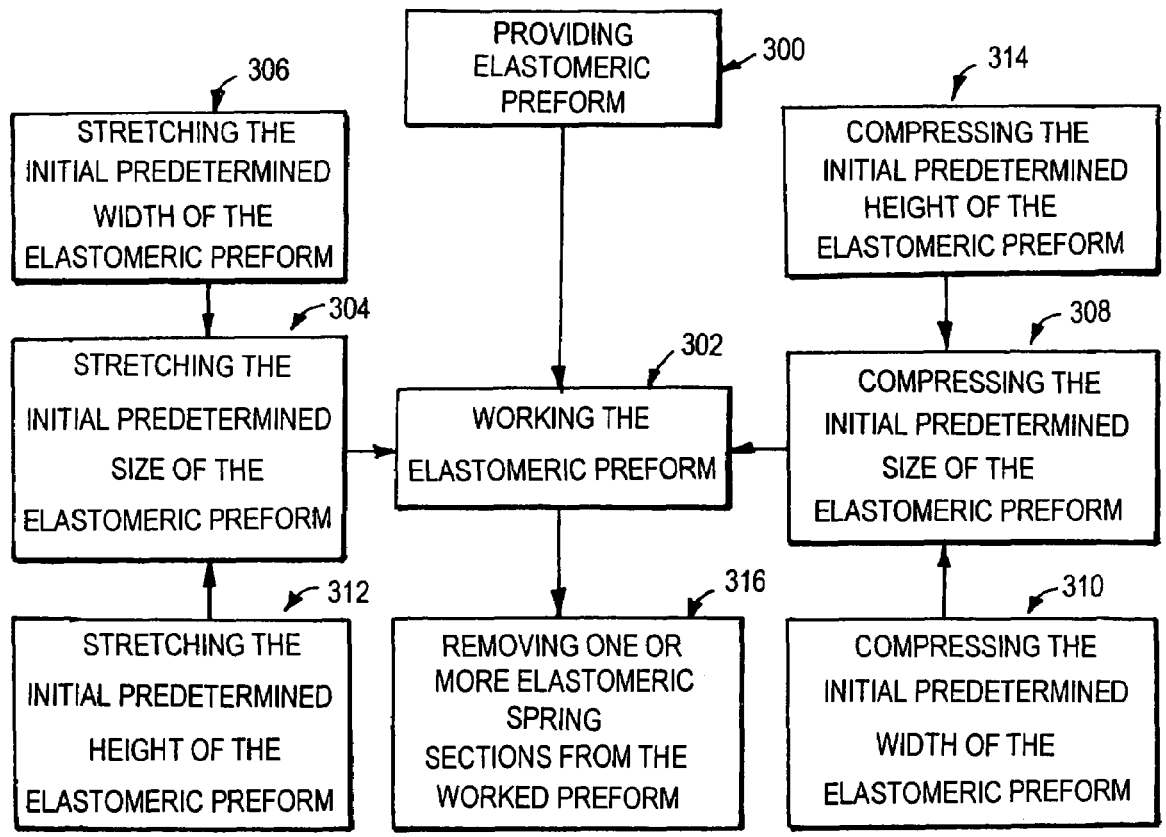
FIG. 13 is a graphical representation of one method or process for making any one of the elastomeric springs illustrated in FIGS. 1 through 12.

While the present invention is susceptible of embodiment in multiple forms, there is shown in the drawings and will hereinafter be described preferred embodiments of the invention, with the understanding the present disclosure sets forth exemplifications of the invention which are not intended to limit the invention to the specific embodiments illustrated and described.

Referring now to the drawings, wherein like reference numerals refer to like parts throughout the several views, there is shown in FIGS. 1 through 4 one form of a one-piece elastomeric spring, generally identified by reference numeral 10, embodying principals of the present invention. Spring 10 defines free end portions 12, 14, 16 and 18 all joined to and radially disposed from a common body portion 20. Two end portions are commonly disposed to opposed sides of axis 22 and two end portions are commonly disposed to opposed sides of axis 24. Each end portion 12, 14, 16 and 18 can independently deflect in response to a load or force being applied thereto. In the illustrated embodiment, end portions 12, 14 and 16, 18 are disposed a substantially equal distance from axis 22. Similarly, end portions 12, 16 along with 14, 18 are disposed a substantially equal distance from axis 24. Spring 10 also has transversely spaced sides 26 and 28. In the illustrated embodiment, the sides 26 and 28 of spring 10 extend generally parallel relative to each other. As shown in FIG. 2, spring 10 defines a first operative distance OD between the spaced end portions 12, 14 and 16, 18. Moreover, spring 10 defines a second operative distance OD' between the spring end portions 12, 16 and 14, 18.

As shown in FIGS. 1 and 2, spring 10 further includes a series of arms 32, 34, 36 and 38 radially extending in opposed directions from the common body portion 20. In the illustrated embodiment, the spring arms 32, 34, 36 and 38 all transversely extend generally parallel to axis 22. Each arm 32, 34, 36 and 38 provides a predetermined resistance to deflection, thus, providing spring 10 with a predetermined spring rate. In the illustrated embodiment, each arm 32, 34, 36 and 38 is substantially similar in configuration and, thus, provides a substantially similar resistance to bending. The distal or terminal end of each arm 32, 34, 36 and 38 defines the free end portions 12, 14, 16 and 18, respectively, of spring 10. Spring arms 32, 34 and 36, 38 are disposed to or arranged on opposed sides of axis 22 while spring arms 32, 36 and 34, 38 are disposed to opposed sides of axis 24.

In the embodiment illustrated in FIGS. 1 and 2, the free end of each arm 32, 34, 36 and 38 defines a generally flat or planar surface 40. Preferably, the flat or planar surfaces 40 defined on arms 32, 34 are arranged in a generally common plane relative to each other. Preferably, the flat or planar surfaces 40 defined on arms 36, 38 are likewise arranged in a generally common plane relative to each other. Moreover, in the embodiment illustrated in FIGS. 1 and 2, the flat or planar surfaces 40 on arms 32, 34 are disposed generally parallel to the flat or planar surfaces 40 on arms 36, 38. Of course, the free end of each arm 32, 34, 36 and 38 could be configured with other than a planar surface, i.e. an arcuate configuration or the like, without detracting or departing from the spirit and scope of the present invention.

In the embodiment shown in FIGS. 2 and 3, the end portions 12 and 14 of spring 10 defined by arms 32 and 34, respectively, are designed to be accommodated in combination with a conventional apparatus A such as a bracket mounted to an underside of a chair or the like. Notably, the flat or planar surface configuration at the free ends of arms 32, 34 facilitate mounting of spring 10 in operable combination with such conventional apparatus A.

To further facilitate operable connection of spring 10 to a conventional apparatus A, an opening 50 is provided toward the distal end of each spring arm 32, 34, 36 and 38. As shown, each opening 50 preferably has a closed margin 51 and transversely extends through the spring and opens to each side 26, 28 for accommodating endwise passage of an elongated threaded fastener or rod (not shown) or the like. Of course, each opening 50 could likewise be configured as a blind bore without detracting or departing from the spirit and scope of the invention.

Another embodiment of a spring embodying principals of the present invention is illustrated in FIGS. 5 through 8. This alternative form of elastomeric spring is designated generally by reference numeral 110. The elements of this alternative form of spring that are identical or functionally analogous to those components or elements of spring 10 discussed above are designated generally by reference numerals identical to those used above with the exception this embodiment of elastomeric spring uses reference numerals in the 100 series.

FIGS. 5 through 8 illustrate a one-piece and generally X-shaped elastomeric spring 110. Spring 110 defines four spaced end portions 112, 114, 116 and 118 all joined to and radially disposed relative to a common body portion 120. Two end portions are commonly arranged on opposed sides of axis 122 and two end portions are commonly arranged on opposed sides of axis 124. As such, each end portion 112, 114, 116 and 118 can independently deflect in response to a load or force being applied thereto. In the illustrated embodiment, the end portions 112, 114 and 116, 118 are disposed a substantially equal distance from axis 122. Similarly, end portions 112, 116 along with 114, 118 are disposed a substantially equal distance from axis 124. Spring 110 furthermore has transversely spaced sides 126 and 128. In the illustrated embodiment, the sides 126 and 128 extend generally parallel relative to each other.

As shown in FIG. 5, spring 110 also includes a series of arms 132, 134, 136 and 138 radially projecting from the body portion 120. In the illustrated embodiment, the spring arms 132, 134, 136 and 138 all transversely extend generally parallel to axis 122. As will be appreciated, each spring arm 132, 134, 136 and 138 provides a predetermined resistance to deflection, thus, providing spring 10 with a predetermined spring rate.

To enhance its versatility, one of the many advantages afforded by the spring design of the present invention relates to the ability to change or modify the spring rate provided by the elastomer spring in different modes of operation while keeping the operative distances OD and OD' of spring 110 substantially equal to the operative distances OD and OD' of spring 10. The cross-sectional design of arms 132, 134, 136 and 138 can be modified in different ways to accomplish the desired results of changing the spring rate in different modes of operation of spring 110.

To change the spring rate in different operational modes of operation, and in the form shown in FIG. 5, the cross-sectional thickness of the arms 132, 136 has been modified relative to the cross-sectional thickness of the arms 134, 136. That is, in the form shown in FIG. 5, the cross-sectional design or thicknesses of the spring arms 132 and 136 is different from the cross-sectional thickness of the spring arms 134 and 138. As such, and when in operation, the combined effectiveness of the spring arms 132, 136 and 134, 138 will provide different spring rates when spring 110 is rocked in a counterclockwise direction (as seen in FIG. 5) as compared to when spring 110 is rocked in a clockwise direction (as seen in FIG. 5).

Alternatively, two of the spring arms disposed to a common side of axis 122 can include a series of throughbores (not shown) having varying diameters extending transversely through the spring arms and, in one form, open to opposed sides 126, 128 of spring 110. Of course, it should be appreciated, elongated arcuate channels or the like, of varying sizes, can likewise be substituted for such throughbores without detracting or departing from the spirit and scope of the present invention. As will be appreciated, the variable cross-section of the arms 132, 134, 136 and 138 will advantageously permit spring 110 to yield a spring rate or load deflection curve different from spring 10 while having the same operative lengths OD and OD' as spring 10.

In the embodiment illustrated in FIG. 5, the free end of each arm 132, 134, 136 and 138 defines a generally flat or planar surface 140. Preferably, the flat or planar surfaces 140 defined by arms 132, 134 are arranged in a generally common plane relative to each other. Moreover, in the embodiment illustrated in FIG. 5, the flat or planar surfaces 140 on arms 132, 134 are disposed generally parallel to the flat or planar surfaces 140 on arms 136, 138.

Preferably, an opening 150 is provided toward the distal end of each arm 132, 134, 136 and 138. In one form, each opening 150 has a closed margin 151 and transversely extends lengthwise through the spring and opens to each side 126, 128 thereof for accommodating endwise passage of an elongated threaded fastener or rod (not shown) or the like. Of course, each opening 150 could likewise be configured as a blind bore without detracting or departing from the spirit and scope of the invention.

Another embodiment of a spring embodying principals of the present invention is illustrated in FIGS. 9 through 12. This alternative form of elastomeric spring is designated generally by reference numeral 210. The elements of this alternative form of spring that are identical or functionally analogous to those components or elements of spring 10 discussed above are designated generally by reference numerals identical to those used above with the exception this embodiment of elastomeric spring uses reference numerals in the 200 series.

Spring 210 is configured as a one-piece, generally X-shaped elastomeric spring having four spaced and free ended portions 212, 214, 216 and 218 all joined to and radially extending from a common body portion 220. Two end portions are commonly disposed to opposed sides of axis 222 and two end portions are commonly disposed to opposed sides of axis 224. As such, each free end portion 212, 214, 216 and 218 can independently deflect in response to a load or force being applied thereto. Spring 210 has transversely spaced sides 226 and 228. In the illustrated embodiment, the sides 226 and 228 extend generally parallel relative to each other.

As shown in FIG. 9, spring 210 also includes a series of arms 232, 234, 236 and 238 radially extending from the body portion 220. In the illustrated embodiment, arms 232 and 236 along with arms 234 and 238 of spring 210 transversely extend generally parallel to axis 222. As will be appreciated, each arm 232, 234, 236 and 238 provides a predetermined resistance to deflection, thus, providing spring 210 with a predetermined spring rate.

In the form shown in FIG. 9, the cross-sectional thickness and radial length of the arms disposed to a common side of axis 224 have been modified relative to each other. That is, in the form shown in FIG. 9, the cross-sectional thickness and length of the arms 232 and 236 are different from the cross-sectional thickness and length of arms 234 and 238. As such, and when in operation, the combined effectiveness of the arms 232 and 236 will provide a different spring rate when spring 210 is rocked in a counterclockwise direction (as seen in FIG. 9) as compared to when spring 210 is rocked in a clockwise direction (as seen in FIG. 9).

In the embodiment illustrated in FIG. 9, the free end of each arm 232, 234, 236 and 238 defines a generally flat or planar surface 240. Because of the difference in their radial length, the flat or planar surfaces 240 defined by arms 232, 234 are arranged at different dispositions relative to each other and relative to axis 224. Similarly, in the embodiment illustrated in FIG. 9, the flat or planar surfaces 240 on arms 234, 236 are disposed at different dispositions relative to each other and relative to axis 224.

Preferably, an opening 250 is provided toward the distal end of each arm 232, 234, 236 and 238. In one form, each opening 250 has a closed margin 251 and transversely extends through the spring and opens to each side 226, 228 thereof for accommodating endwise passage of an elongated rod or fastener (not shown) or the like. Of course, each opening 250 could likewise be configured as a blind bore without detracting or departing from the spirit and scope of the invention.

Although not shown, it should be appreciated, any of the embodiments of the elastomeric spring shown and described above can further include an eye section arranged toward each free end portion of the spring. Preferably, each eye section defines a throughbore or opening extending transverse to the longitudinal axis of the spring. As will be appreciated, each eye section can be formed integral with the elastomeric spring or can be formed as an attachment thereto without detracting or departing from the spirit and scope of the invention.

FIG. 13 schematically illustrates one method or process for making any of the elastomeric curved compression springs shown and described above. For exemplary purposes, a process for making a spring similar to that shown in FIGS. 1 through 4 will be described. It should be appreciated, however, a process similar to that described could be equally used to create the other spring embodiments without detracting or departing from the spirit and scope of the invention.

At Step 300, a monolithic preform, generally identified in FIGS. 14 through 17 by reference numeral 410 is provided. According to this method of making the spring, and at the onset of the spring forming process, the preform used to form the spring has a predetermined length and a predetermined height. Suffice it to say, and when originally provided, the preform 410 has a configuration similar to the resultant shape of the desired elastomeric spring.

As shown, preform 410 a series of spaced arms 432, 434, 436 and 438 radially extending from a common body portion 420. As shown, each arm 432, 434, 436 and 438 projects in opposed radial directions away from the common body portion 420 of the preform 410. Two arms 432, 436 are disposed to or arranged on a common side of axis 422 while arms 434, 438 are disposed to a common side of axis 422. Moreover, and in the preform illustrated for exemplary purposes, two arms 432, 434 are disposed to or arranged on a common side of axis 422 while arms 434, 438 are disposed to a common side of axis 424. In the illustrated embodiment, arms 432 and 436 along with arms 434 and 438 of the preform transversely extend generally parallel to axis 422. The distal or terminal ends of the arms 432, 434, 436 and 438 define free end portions 412, 414, 416 and 418, respectively, of the preform 410.

In the illustrated embodiment, each arm 432, 434, 436 and 438 of the preform 410 is substantially similar in configuration. In the embodiment illustrated in FIGS. 14 through 17, the free end of each arm 432, 434, 436 and 438 defines a generally flat or planar surface 440. Preferably, an opening 450 having a closed margin 451 is provided toward the distal end of each arm 432, 434, 436 and 438. In the illustrated embodiment, each opening 450 extends transversely through the preform 410 and opens to each side 426, 428 thereof. Of course, each opening 450 could likewise be configured as a blind bore.

The preform 410 can be formed of almost any elastomer having tensile characteristics such that the ratio of plastic strain to elastic strain is greater than 1.5 to 1. The preferred elastomer is a copolyester polymer elastomer manufactured and sold by E. I. duPont de Nemoirs under the trademark Hytrel®. The elastomeric material has a molecular structure and preform 410 preferably has a Shore D durometer hardness ranging between about 37 and 57 durometer. The most preferred embodiment of preform 410 has a Shore D durometer measuring between about 40 and about 55. The elastomer material forming preform 410 is normally free of spring-like characteristics and is reasonably inert. Significantly, such elastomer is quite durable and has an excellent flex life. Moreover, such elastomer is not subject to tearing or to crack propagation even in relatively thin cross-sections. As known, conventional thermosetting synthetic and natural rubbers do not have the requisite fatigue resistance at these hardness levels. For a more complete description of this elastomer, attention is directed to U.S. Pat. No. 4,198,037 to D. G. Anderson; applicable portions of which are incorporated herein by reference.

Normally, the selected elastomer material is purchased in pellet form, melted, and, in a preferred form, extruded into a generally X-shaped preform. Alternatively, the pellets can be melted and then injected into a mold to form the preform 410. Other various plastic molding techniques such as melt casting, injection molding, rotational molding, etc, can also used to fabricate the preform 410.

After the preform 410 is formed, the preform 410 is worked, at Step 302 (FIG. 13), in manner orienting the molecular structure of the elastomer material. That is, at process Step 302, the molecular structure of the elastomer material forming the preform 410 is oriented, in at least one direction, such that a predetermined spring rate is imparted to and transmutes the preform 410 into an elastomeric spring.

Figure 14:
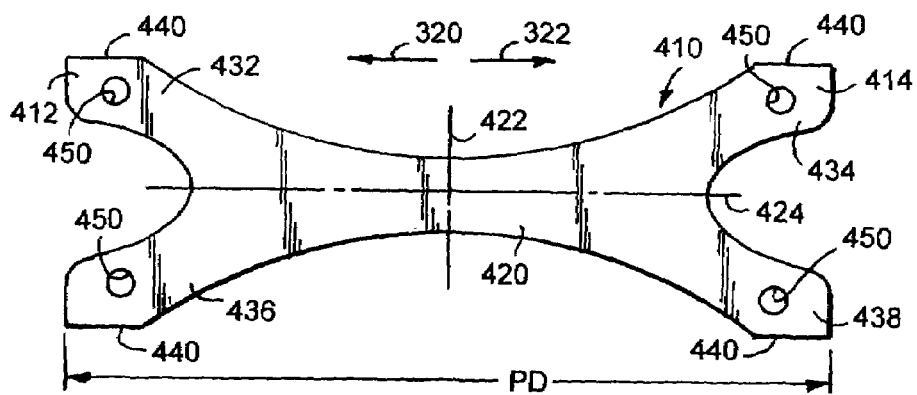
FIG. 14 is an end elevational view showing one step in working of a preform used during the process of making the elastomeric spring shown in FIGS. 1 through 4.

As used herein and throughout, the phrase or term "working" or "worked" means and refers to controllably manipulating the preform 410 after it is formed. More specifically, and in accordance with one spring forming method, after the preform 410 is initially fabricated, and at process Step 304, the preform 410 is stretched to a predetermined distance PD (FIG. 14). At Step 306, and as shown in FIG. 14, the preform 410 is stretched in the direction of the opposed arrows 320 and 322 for a distance greater than 30% to 35% of the preform's initial predetermined length. The elongation of the preform 410 causes the molecular structure of the elastomer to orient in at least one direction whereby resulting in transmutation of the preform 410 into a spring.

Figure 15:
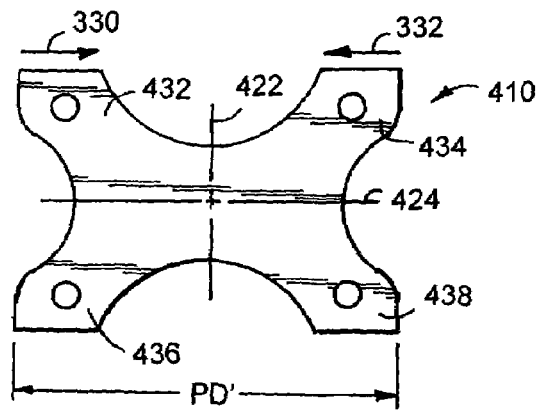
FIG. 15 shows another step in working of a preform used during the process of making the elastomeric spring shown in FIGS. 1 through 4.

After stretching the preform 410, the forces acting to pull the ends of the preform 410 in the direction of arrows 320 and 322 is released. Thereafter, and at process Step 308, the preform 410 is compressed to a predetermined distance PD' (FIG. 15). At Step 310, and as shown in FIG. 15, the opposed ends of the preform 410 are compressed (in a press or the like) toward each other in the direction of the opposed arrows 330 and 332 for a distance greater than 30% to 35% of the preform's initial predetermined length. The elongation or stretching of the preform 410 followed by the compression of the preform 410 causes the molecular structure of the elastomer to orient in at least one direction facilitating transmutation of the preform 410 into a spring.

Figure 16:
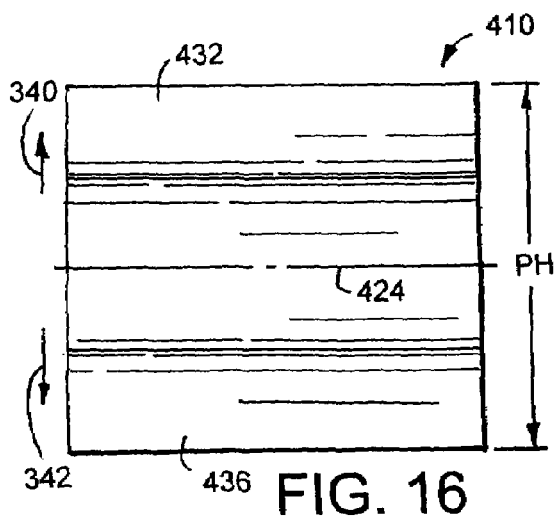
FIG. 16 shows still another step in working of a preform used during the process of making the elastomeric spring shown in FIGS. 1 through 4.

After the preform 410 is fabricated, and at process Step 312, the preform 410 is stretched to a predetermined height PH (FIG. 16). At Step 312, the preform 410 is stretched in the direction of the opposed arrows 340 and 342 for a distance greater than 30% to 35% of the preform's initial predetermined height. Stretching or elongation of the preform 410 in the direction of the opposed arrows 340, 342 furthermore causes the molecular structure of the elastomer to orient in at least one direction whereby resulting in transmutation of the preform 410 into a spring.

Figure 17:
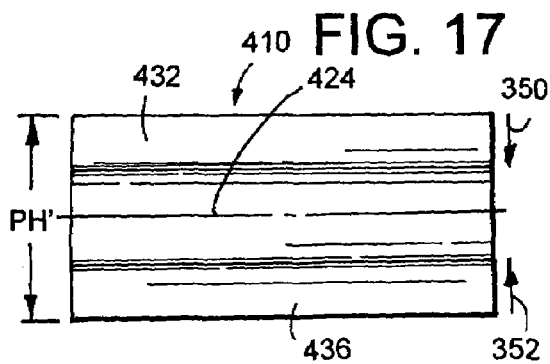
FIG. 17 shows yet another step in working of a preform used during the process of making the elastomeric spring shown in FIGS. 1 through 4.

After stretching the preform 410 in the direction of arrows 340, 342, the forces acting to stretch the preform 410 released. Thereafter, and at process Step 314 the preform 410 is compressed to a predetermined height PH' (FIG. 17). At Step 314, and as shown in FIG. 17, the preform 410 is compressed (within a press or the like) in the direction of the opposed arrows 350 and 352 for a distance greater than 30% to 35% of the preform's initial predetermined height. The elongation of the preform 410 in the direction of arrows 340, 342 followed by the compression of the preform 410 in the direction of arrows 350, 352 causes the molecular structure of the elastomer to orient in at least one direction facilitating transmutation of the preform 410 into a spring.

Of course, the process of working the preform 410 can include process Steps 304 through 314 either individually, or in combination, or in reverse order relative to each other without detracting or departing from the present invention. During working of the preform 410, the predetermined operative distances OD and OD' of the resultant spring may require correction. Accordingly, the preform can thereafter be stretched or pulled in opposed directions to accomplish the desired operative distances OD and OD' of the spring as may be required.

Upon completion of the "working" process for the preform 410, the resultant spring takes a compression spring shape "set", i.e., similar to that illustrated in any of the FIGS. 1 through 12, with the predetermined operative distances OD and OD' of the particular spring. After the preform 410 is worked, the resultant spring is substantially free of compression set problems within the range of initial compression and, upon subsequent compressions, the end portions of the resultant spring are maintained in substantially fixed relation relative to each other and, after a force or load is exerted upon the free end portions, the resultant spring will provide a repeatable and substantially constant spring rate and will constantly return or spring back to the desired shape. In part, the "spring back" characteristics, as well as the spring rate characteristics of the resultant spring are the result of the orientation of the molecules of Hytrel® resulting from "working" of the preform 410.

According to the process set forth in FIG. 13, at process Step 316, and depending upon the operative distance or transverse size desired between the transversely spaced sides of the resultant spring after the preform 410 is worked, the resultant spring can be cut, severed, sawed, sliced or otherwise removed from the preform 410. Of course, if the preform 410 is sized to the correct operative distance or transverse size desired between the transversely spaced sides of the resultant spring, process Step 316 can be eliminated without detracting or departing from the spirit and scope of the invention.

Persons skilled in the art of elastomeric spring design will discover modifications of the subject elastomer preform, according to the above disclosure, will produce varying spring rates that satisfy substantially any desired end. Besides modifying the design of the elastomer preform, changes in the spring rate of the resultant spring invention can also be varied by changing the operative distance or length between the free ends of the elastomer spring and either axis 22, 24. Additionally, the resultant elastomer spring is quite durable and has an excellent flex life. Moreover, the resultant elastomer spring is generally not subject to tearing or to crack propagation even when the mid-portion thereof has relatively thin cross-sections.

From the foregoing, it will be observed that numerous modifications and variations can be made and effected without departing or detracting from the true spirit and novel concept of the present invention. Moreover, it will be appreciated, the present disclosure is intended to set forth an exemplification of the invention which is not intended to limit the invention to the specific embodiment illustrated. Rather, this disclosure is intended to cover by the appended claims all such modifications and variations as fall within the spirit and scope of the claims.

What is claimed is:

1. A one-piece elastomeric spring, generally rectangular in plan, with a top side, a bottom side, a left side, a right side and having four load bearing and generally rigid arms all joined to and radiating outwardly from a common body portion so as to provide said spring with a generally X-shape, with each arm terminating in a free ended portion such that each load bearing arm deflects independently of the other arms when a force is applied during use of said spring, and with said top side, said bottom side, along with said left and right sides of said spring each having a concave shaped configuration therebetween, and with said one-piece spring being formed from a preform formed from an elastomer which is free of resilient characteristics, and wherein the elastomer from which said preform is created has a molecular structure along with a ratio of plastic strain to elastic strain greater than 1.5 to 1, and with said preform being worked by stretching and compressing said preform such that the molecular structure of said preform is oriented in at least one direction so as to allow a predetermined spring rate to be imparted to said preform whereby transmuting said preform into said elastomeric spring.

2. The elastomeric spring according to claim 1, wherein said spring has a spring rate which can be varied by adjusting a distance a distal end of each arm is disposed away from said common body portion.

3. The elastomeric spring according to claim 2, wherein the arms on said spring are configured such that two of the arms disposed to one common side of said spring combine with each other to provide said spring with a first spring rate, and wherein the two arms disposed to an opposed common side of said spring combine with each other to provide said spring with a second spring rate.

4. The elastomeric spring according to claim 2, wherein the arms projecting from said common body portion of said spring generally correspond in cross-sectional configuration relative to each other such that each arm provides a spring rate generally equal to that provided by the other arms of said spring.

5. The elastorneric spring according to claim 2, wherein at least two of the arms projecting from said common body portion of said spring generally correspond in cross-sectional configuration relative to each other such that at least two of the arms provide a spring rate different from the spring rate provided by the other arms of said spring.

6. A one-piece generally X-shaped elastomeric spring, generally rectangular in plan, with a top side, a bottom side, a left side, a right side, a generally planar front side, and a generally planar rear side and including four load bearing and rigid arms all joined to and radially extending from a common body portion, with two of the load bearing arms being disposed to each side of a centerline of said spring, and with each arm extending between the front and rear sides of said spring, and with each arm terminating in a free ended portion such that each arm radially and flexurally deflects independently of the other arms when a force is applied to said spring during use, and wherein at least one of said arms defines an aperture having a closed margin extending between and opening to the front and rear sides of said spring so as to modify the spring rate of said arm defining said aperture, and with said top side, said bottom side, along with said left and right sides of said spring each having a concave shaped configuration therebetween, and with said one-piece spring being formed from a preform formed from an elastomer which is free of resilient characteristics, and wherein the elastomer from which said preform is created has a molecular structure along with a ratio of plastic strain to elastic strain greater than 1.5 to 1, and with said preform being worked by both stretching and compressing said preform such that the molecular structure of said preform is oriented in at least one direction so as to allow a predetermined spring rate to be imparted to said preform whereby transmuting said preform into said elastomeric spring.

7. The elastomeric spring according to claim 6, wherein said spring has a spring rate which can be varied by changing a distance between a distal end of each arm of said spring and said common body portion of said spring.

8. The elastomeric spring according to claim 6, wherein two of the arms disposed to one common side of said spring combine with each other to provide said spring with a first spring rate, and wherein two of the arms disposed to an opposed common side of said spring combine with each other to provide said spring with a second spring rate.

9. The elastomeric spring according to claim 6, wherein the arms projecting from said common body portion generally correspond in cross-sectional configuration relative to each other such that each arm provides a spring rate generally equal to that provided by the other arms of said spring.

10. The elastomeric spring according to claim 6, wherein the arms projecting from one side of said common body portion have a different cross-sectional configuration from those arms projecting from an opposed side of said common body portion.

11. A one-piece elastomeric spring created from an elastomeric preform which is free of resilient characteristics, with said preform having a generally X-like shape, generally rectangular in plan with a top side, a bottom side, a left side, a right side and a series of load bearing and rigid arms radially projecting in opposed directions relative to each other from a central body portion, with two of the load bearing arms being disposed to each side of a centerline of said spring, and with each arm terminating in a free ended portion such that, during operation of said spring, each arms radially and flexurally deflects independent of the other arms when a force is applied to the spring during use, and with said preform having an initial predetermined width defined by a first distance between a generally planar front side and a generally planar rear side of said preform, and with said preform having an initial predetermined height defined by a second distance between the distal ends of two of said arms disposed to opposite sides of said central body portion, and with said preform having an initial predetermined length defined by a third distance between the left side and right side of said preform, and with said top side, said bottom side, along with said left side and said right side of said preform each having a generally concave shaped configuration extending between the generally planar front side and the generally planar rear side of the preform, and wherein each arm extends between the generally planar front side and the generally planar rear side of the preform, and wherein the elastomer forming said preform has a molecular structure along with a ratio of plastic strain to elastic strain greater than 1.5 to 1, and wherein the molecular structure of at least a portion of said preform is oriented as a result of working said preform by stretching the initial predetermined length and compressing the initial predetermined height of said preform to a length and height, respectively, greater than 30% to 35% thereby allowing said preform to transmute into said elastomeric spring.

12. The elastomeric spring according to claim 11, wherein said spring has a spring rate which can be varied by changing a distance between a distal end of each arm of said preform and said common body portion of said preform.

13. The elastomeric spring according to claim 11, wherein each pair of arms projecting from one side of the common body portion of said preform has a cross-sectional configuration unlike that provided by the other pair of arms projecting from an opposite side of the common body portion of said preform such that, after said spring is formed, each pair of arms provide a spring rate which is different from the spring rate provided by the other pair of arms of said spring.

14. The elastomeric spring according to claim 11, wherein at least two of the arms projecting from said common body portion of said preform generally correspond in cross-sectional configuration such that said at least two of the arms provide a spring rate different from the spring rate provided by the other arms of said spring.

15. The elastomeric spring according to claim 11, wherein the arms projecting from one side of said common body portion of said preform each have a different cross-sectional configuration from those arms projecting from an opposite side of said common body portion of said preform.

16. The elastomeric spring according to claim 11, wherein each arm of said spring defines an aperture with a closed margin defined toward a distal end of said arm so as to modify the spring rate of said arm defining said aperture and facilitate connection of said spring to an apparatus.

* * * * *